US007916684B2

(12) United States Patent
Henderson et al.

(10) Patent No.: US 7,916,684 B2
(45) Date of Patent: Mar. 29, 2011

(54) WIRELESS COMMUNICATION NETWORK PROVIDING COMMUNICATION BETWEEN MOBILE DEVICES AND ACCESS POINTS

(75) Inventors: Gregory Newell Henderson, Sudbury, MA (US); Dennis Michael Martinez, Westford, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 461 days.

(21) Appl. No.: 10/985,589

(22) Filed: Nov. 11, 2004

(65) Prior Publication Data

US 2006/0098609 A1   May 11, 2006

(51) Int. Cl.
*H04W 4/00* (2009.01)
(52) U.S. Cl. .................................. 370/328; 370/338
(58) Field of Classification Search .............. 455/41.2; 370/328, 329, 336, 337, 338
See application file for complete search history.

(56) References Cited

U.S. PATENT DOCUMENTS

| 5,479,400 | A | 12/1995 | Dilworth et al. | |
|---|---|---|---|---|
| 6,560,443 | B1 | 5/2003 | Vaisanen | |
| 6,654,616 | B1 | 11/2003 | Pope, Jr. et al. | |
| 6,687,503 | B1 | 2/2004 | Porter et al. | |
| 6,728,514 | B2 | 4/2004 | Bandeira et al. | |
| H2106 | H | 7/2004 | Bilgic et al. | 370/281 |
| 6,816,706 | B1 | 11/2004 | Hohnstein et al. | 455/25 |
| 6,847,625 | B2 | 1/2005 | Heinonen et al. | 370/338 |
| 6,891,821 | B2 | 5/2005 | Krishnakumar et al. | 370/343 |
| 7,039,358 | B1 * | 5/2006 | Shellhammer et al. | 455/41.2 |
| 2002/0058513 | A1 | 5/2002 | Klein et al. | |
| 2003/0108016 | A1 | 6/2003 | Bonta | 370/338 |
| 2003/0194995 | A1 | 10/2003 | Handerson et al. | 455/422.1 |
| 2003/0235175 | A1 | 12/2003 | Naghian et al. | 370/338 |
| 2004/0014442 | A1 | 1/2004 | Okanobu | |
| 2004/0062214 | A1 | 4/2004 | Schnack et al. | 370/315 |
| 2004/0162115 | A1 | 8/2004 | Smith et al. | 455/562.1 |
| 2004/0174839 | A1 | 9/2004 | Lopes | |
| 2004/0213218 | A1 | 10/2004 | Dougherty et al. | 370/386 |
| 2004/0253984 | A1 | 12/2004 | Csapo et al. | 455/561 |
| 2004/0258033 | A1 * | 12/2004 | Heinonen et al. | 370/338 |
| 2005/0030968 | A1 | 2/2005 | Rich et al. | 370/449 |
| 2005/0036470 | A1 | 2/2005 | Calvert | 370/338 |

FOREIGN PATENT DOCUMENTS

| EP | 1 292 073 | * | 3/2003 |
|---|---|---|---|
| EP | 1 406 416 | | 4/2004 |
| EP | 1 448 011 A1 | | 8/2004 |
| WO | WO 97/38509 | | 10/1997 |
| WO | WO 02/078369 | | 10/2002 |

* cited by examiner

*Primary Examiner* — George Eng
*Assistant Examiner* — Michael Faragalla
(74) *Attorney, Agent, or Firm* — Allen, Dyer, Doppelt, Milbrath & Gilchrist, P.A.

(57) ABSTRACT

A wireless communication network is provided that includes a plurality of access points. A plurality of the access points are configured as local access points that are each configured to operate at one of a set of frequencies and within a communication range. The local access points may communicate with a mobile device within the corresponding local access point communication range. The wireless network further includes an access point configured as a master access point to communicate with each of the plurality of local access points at a frequency that is outside the set of frequencies of the local access points.

18 Claims, 3 Drawing Sheets

WIRELESS COMMUNICATION NETWORK PROVIDING COMMUNICATION BETWEEN MOBILE DEVICES AND ACCESS POINTS

BACKGROUND OF THE INVENTION

This invention relates generally to wireless networks, and more particularly, to a wireless network for communicating using multiple access points.

The use of broadband wireless networks (e.g., 802.11 WLAN) has increased due to these networks providing high-speed network access (e.g., communication speeds greater than 1 Mbps) in a wireless environment. Users of these wireless networks can move to different locations in a coverage area and maintain network connectivity. These networks are typically configured having wireless access points, sometimes referred to as hot-spots, that each provide a wireless communication range of typically about 100 meters. These wireless access points are connected to a wired network using, for example, a high-speed network connection such as fiber optics, T-1, DSL, cable modem, etc. The communication path in these wireless networks is typically from (i) a mobile user to an access point (AP) across the wireless link and (ii) from the AP to the network (e.g., wide area network (WAN)) using a wired connection. Thus, a mobile device (e.g., laptop computer) communicates with the network via one or more wireless access points. However, because of the limited range for communicating with an access point (e.g., about 100 meters), many access points are required to cover a large communication area. This then requires many high speed wired network connections, often referred to as a backhaul, for each access point. The increased number of wired connections increases the cost and complexity of such wireless networks, and sometime does not provide a practical implementation.

Networks have been developed having a mesh configuration to address the backhaul issue. In this mesh configuration, each of the access points and/or nodes in the network can communicate information between adjacent or neighboring access points and/or nodes, thus providing a form of wireless backhaul for the network. In this mesh network, a message from a mobile user can "hop" from one access point to another access point until it reaches a wired backhaul connection. Thus, a network with fewer wired access points may be implemented. However, in such a network, the effective throughput of the network is substantially reduced as the user's message travels over multiple "hops" to get to the wired backhaul. More particularly, when using a mesh routing protocol the effective network data rate drops rapidly as the number of hops increases. The decrease in throughput results from a lack of frequency planning and channel allocation to separate the bandwidth of the AP-mobile messages and the backhaul messages between access points that carry the message back to the wired network. In general, each access point has a single radio that is used to communicate with both the mobile users and the other access points in the network. The lack of available bandwidth for backhaul and frequency planning greatly limits the scalability of this mesh network architecture. As the mesh network is implemented over larger areas, a larger percentage of the total capacity (e.g., backhaul/mobile capacity) is used to transmit updates to the network routing status.

Thus, known wireless communication systems having different configurations may be complex to implement, have reduced throughput, and provide limited scalability.

BRIEF DESCRIPTION OF THE INVENTION

According to an exemplary embodiment, a wireless network is provided that includes a plurality of access points. A plurality of the access points are configured as local access points that are each configured to operate at one of a set of frequencies and within a communication range. The local access points may communicate with a mobile device within the corresponding local access point communication range. The wireless network further includes an access point configured as a master access point to communicate with each of the plurality of local access points at a frequency that is outside the set of frequencies of the local access points.

According to another exemplary embodiment, a wireless network architecture is provided that includes a plurality of local access points each defining a wireless access coverage area and each having a local communication channel to communicate with mobile devices within the wireless coverage area. The network architecture also includes a master access point to provide communication between the plurality of local access points and a wired network and having a master communication channel that is distinct from the local communication channels. The wireless network architecture further includes a first communication device (e.g., a first radio) corresponding to each of the local access points to communicate between the local access points and mobiles devices. The first communication devices are configured to communicate using the local communication channels. The wireless network architecture further includes a second communication device (e.g., a second radio) corresponding to each of the local access points to communicate between each of the local access points and the master access point. The second communication devices are configured to communicate using the master communication channel.

According to yet another exemplary embodiment, a method for wirelessly communicating in a network is provided and includes configuring a plurality of local access points to communicate with mobile devices within a wireless access coverage area corresponding to each of the plurality of access points using one of a set of frequencies. The method further includes configuring a master access point to provide communication between the local access points and a wired network using a frequency that is different than the set of local access point frequencies.

DETAILED DESCRIPTION OF THE INVENTION

Figure 1:
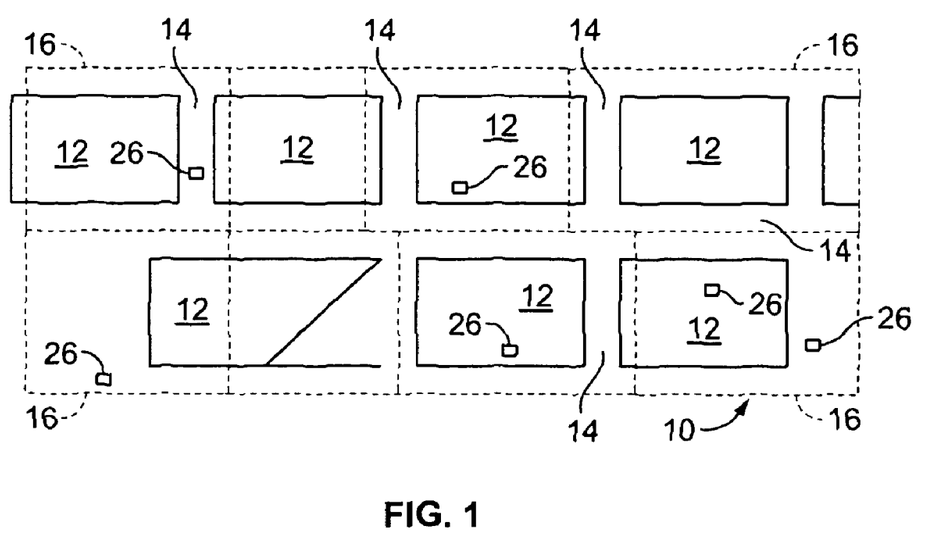
FIG. 1 is a block diagram illustrating a wireless coverage area in accordance with various embodiments of the invention.

Various embodiments of the present invention provide a wireless network architecture allowing one or more wireless devices to communicate over and/or with a network over different regions within a wireless network coverage area. For example, and as shown in FIG. 1 a wireless coverage area 10 may generally cover an area defined by a geographic region, such as, for example, a plurality of blocks 12 within a city or town. Each of the blocks may be separated by a street 14 and each of blocks may include, for example, one or more buildings (not shown), an open area or field, a park, etc. The wireless coverage area 10 may include and be defined by, for example, one or more wireless local access areas 16 (e.g., WiFi hot-spots). The local access areas 16 may cover more or less than a block in the geographic region, for example, based on system or communication requirements, and/or based on the size of the blocks.

One or more mobile devices 26 (e.g., laptop computer or personal digital assistant (PDA)) having wireless communication capabilities (e.g., an installed wireless communication card) may be located with these different local access areas 16 (e.g., on a street 14 or in a building) and/or may be moving between these local access areas 16. Thus, a mobile device 26 may move through the wireless coverage area 20 and maintain connection and communication with a network using the wireless local access areas 16.

Figure 2:
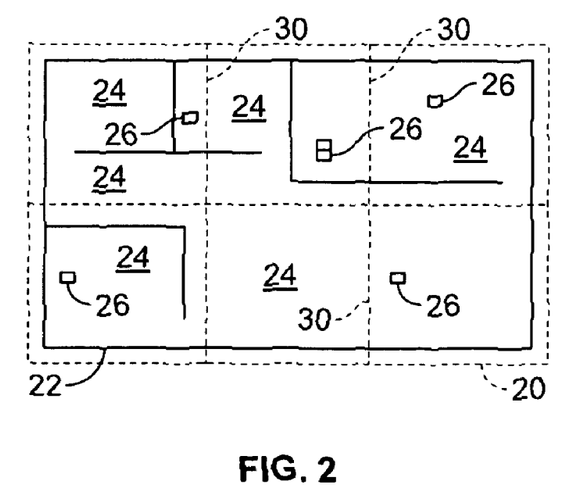
FIG. 2 is a block diagram illustrating another wireless coverage area in accordance with various embodiments of the invention.

As another example, a wireless coverage area 20 may generally cover an area defined by a physical structure 22 (e.g., a building). The wireless coverage area 20 may include and be defined by, for example, one or more wireless local access areas 30 (e.g., WiFi hot-spots). The total area covered by the wireless coverage area 20 may be larger or smaller than the structure 22, for example, based on system or communication requirements.

Within the structure 22, different areas 24 (e.g., different rooms) may be provided. One or more mobile devices 26 (e.g., laptop computer or personal digital assistant (PDA)) having wireless communication capabilities (e.g., an installed wireless communication card) may be located with these different areas 24 and/or may be moving between these different areas 24. It should be noted that each area 24 may be covered by one or more wireless local access areas 30 to allow wireless communication with the network. Thus, a mobile device 26 may move through the coverage area 20 and maintain connection and communication with a network using the wireless local access areas 30.

Figure 3:
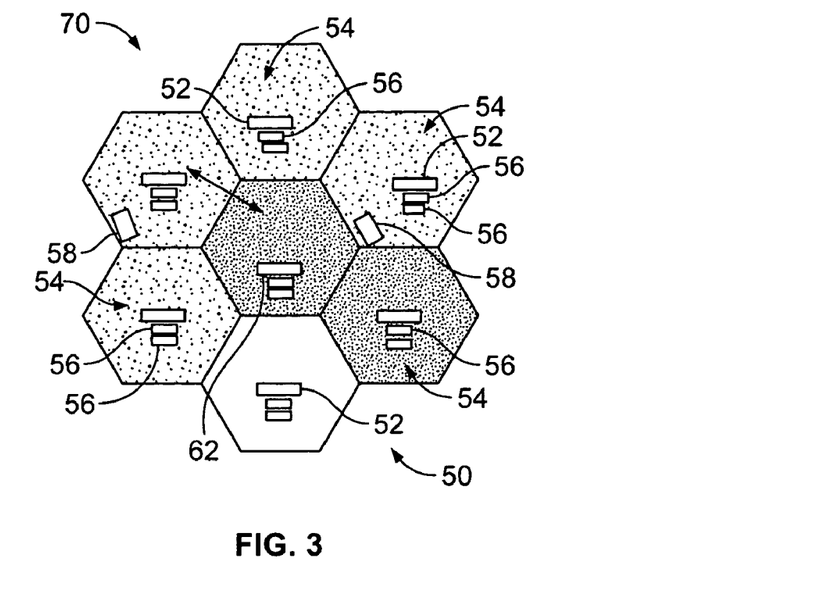
FIG. 3 is a block diagram of a wireless network architecture including a communication cell in accordance with various embodiments of the invention.

More specifically, and in an exemplary embodiment as shown in FIG. 3, a wireless network architecture 50 is provided that uses a wireless channel (e.g., broadband wireless links) to provide communication from local access points 52 to mobile devices 58 and a backhaul communication system, while ensuring available (e.g., guaranteed) bandwidth for both. Additionally, and as described in more detail herein, the wireless network architecture 50 provides micro and macro-frequency planning that allows the network to be scaled to cover large areas with minimal or no loss in throughput. It should be noted that although different reference numbers may be used in the different figures, the components therein, such as, for example, the access points, coverage areas, mobile devices, etc. may be the same and/or may be different as desired or needed, such as, based on system or application requirements.

The wireless network architecture 50 is defined by a plurality of local access points 52 each providing a defined wireless access coverage area 54. For example, and referring to FIG. 2, the wireless local access areas 30 may be provided by the local access points 52 that define wireless access coverage areas 54, each of which may encompass a local access area 30, or more or less than a single local access area 30. Each local access point 52 may include one or more communication devices, for example, radios 56 to provide communication between a mobile device 58 (e.g., laptop computer with installed wireless communication card) within the associated wireless access coverage area 54 and the network. The radios 56 may be configured as desired or needed, and as is known, to provide wireless communication. For example, the radios 56 each may include a transceiver, an antenna and a router for communicating with at least one of (i) the mobile device(s) 58 within the wireless access coverage area 54 covered by the particular radio 56, (ii) a radio in an adjacent wireless access coverage area 54 and (iii) the network via a wired connection (e.g., a wired LAN).

Figure 5:
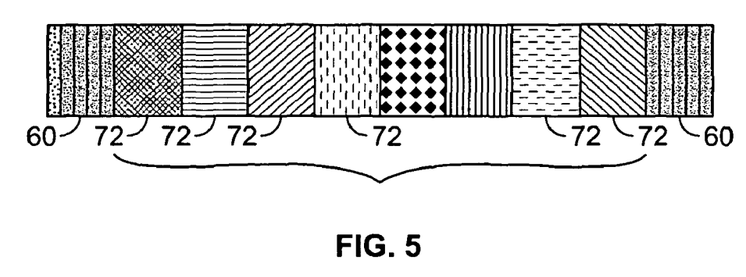
FIG. 5 is a block diagram illustrating a communication frequency configuration in accordance with various embodiments of the invention.

In operation, and in an exemplary embodiment, the mobile devices 58 communicate with the local access points 52 using one of a set of frequencies or channels, for example, as shown in FIG. 5, using one of ten 1 MHz channels 60 in the 4.9 GHz public safety spectrum. However, it should be noted that the frequency range may be modified as desired or needed. For example, the radios 56 may be configured using the EEEE 802.11 communication standard to provide wireless communication, such as, 802.11b, often referred to as WiFi. As another example, the radios may be configured using the IEEE 802.16 communication standard to provide wireless communication, often referred to as WiMAX. It should be noted that in the various embodiments, multiple access points may use the same frequency, in which case, methods to avoid self interference are implemented, such as, for example, spatial and/or time diversity.

The number of frequencies may be selected, for example, to allow for a tessellated frequency plan and frequency reuse model for the mobile devices 58 to communicate with the local access points 52. In this embodiment, one access point is configured as the master access point 62 for wirelessly communicating with the local access points 52 and with the network via a wired connection. For example, in the embodiment shown in FIG. 2, the middle access point within the tessellated arrangement may be configured as the master access point 62.

The local access points 52 are configured to communicate with the master access point 62 using a set of frequencies or channels. For example, in an exemplary embodiment, the master access point 62 communicates with each of the local access points 52 associated therewith using a single channel (e.g., single frequency) from a set of eight 5 MHz channels in the 4.9 GHz public safety spectrum. However, it again should be noted that the frequency range may be modified as desired or needed.

It should be noted that the wireless access coverage areas 54 of the local access points 52 and master access point 62 define a wireless communication cell 70 (e.g., defined by the seven wireless access coverage areas 54 shown in FIG. 3). Within the wireless communication cell 70, and for example, each of the access points (both the local access points 52 and the master access point 62) provide communication with mobile devices 58 using a set of frequencies, that in one embodiment provide communication rates up to about 2 Mbps. Further, each of the local access points 52 provide communication with the master access point 62 using a single frequency that in one embodiment provides communication rates up to about 10 Mbps.

Figure 4:
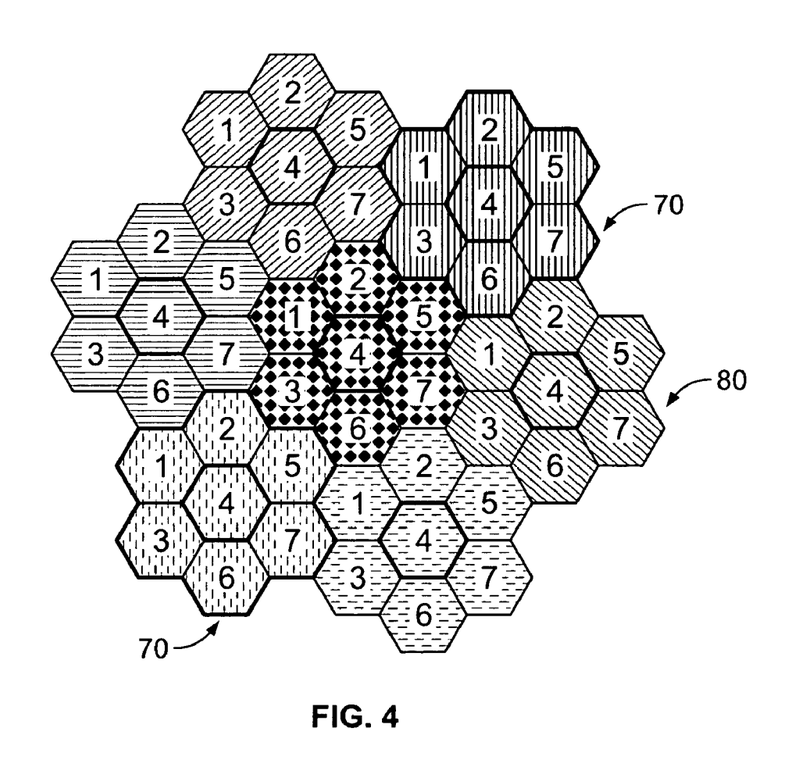
FIG. 4 is a block diagram of a backhaul macro-communication cell including a plurality of communication cells as shown in FIG. 2 in accordance with various embodiments of the invention.

In various embodiments, all of the local access points 52 in one communication cell 70 use a single backhaul frequency that may form an element of a backhaul macro-communication cell 80 as shown in FIG. 4. Thus, a plurality of communication cells 70 (e.g., seven shown in FIG. 4) together form a backhaul macro-communication cell 80, which in one embodiment is also configured using a tessellated frequency plan to provide a large-scale frequency reuse to the backhaul network.

In an exemplary embodiment, each of the communication cells 70 includes a master access point 62 configured as the backhaul access point, for example access point "4" that communicates with the network via a wired backhaul connection (e.g., wired connection to a network). It should be noted that communication within each of the communication cells 70, and in particular, from the local access points 52 to the backhaul access point (e.g., master access point 62) may be provided using seven of the eight 5 MHz channels 72 in the 4.9 GHz public safety spectrum as shown in FIG. 5. For example, communication may be provided from 4.94 GHz to 4.99 GHz, with ten 1 MHz frequency channels (five at each end of the frequency range) for local access point 52 to mobile 58 communication and eight 5 MHz frequency channels for local access point 52 to master access point 62 communication. In an exemplary embodiment, and referring again to FIG. 4, seven of the ten 1 MHz frequency channels and seven of the eight 5 MHz frequency channels may be used to provide communication. However, only one (or less than seven) of each of the 1 MHz frequency channels and the 5 MHz frequency channels may be used, in which case, methods to avoid self interference are implemented, such as, for example, spatial and/or time diversity. It should again be noted that the frequency range may be modified as desired or needed.

The various embodiments allow the local access points 52 to reduce or eliminate self-interference in the backhaul network. In these various embodiments, the backhaul macro-communication cell 80 provides that the bandwidth of the backhaul link can be configured to exceed the bandwidth of the mobile device 58 to access point 52 link, which allows the network to provide quality-of-service (QoS) guarantees from, for example, a WAN to a mobile client.

Thus, in various embodiments, a wireless communication architecture is provided wherein a plurality of local access points 52 wirelessly communicate with mobile devices 58 using a different frequency in each wireless access coverage area 54 associated with the corresponding local access point 52 (e.g., a plurality of local communication channels) and communicate with a master access point 62 or backhaul access point wirelessly using a single frequency (e.g., a master communication channel) different than the frequencies used within each of the wireless access coverage areas 54. In an exemplary embodiment, the local access points 52 include two radios 56, one radio configured to provide communication between the local access point 52 and the mobile devices 58 (e.g., laptop computer with installed wireless communication card) within the wireless access coverage areas 54 and one radio configured to provide communication between the local access point 52 and the master access point 62. Thus, each of the first radios 56 corresponding to the local access point 52 within each of the wireless access coverage areas 54 are configured to communicate with mobile devices 58 using a first set of frequencies (e.g., the same or different frequencies within the set of frequencies) and each of the second radios 56 are configured to communicate with the master access point 62 using a single frequency that is different than any of the first set of frequencies of the first radios 56. It should be noted that the first and second radios 56 may be separate physical radios or may be a single radio with multiple transceivers.

Figure 6:
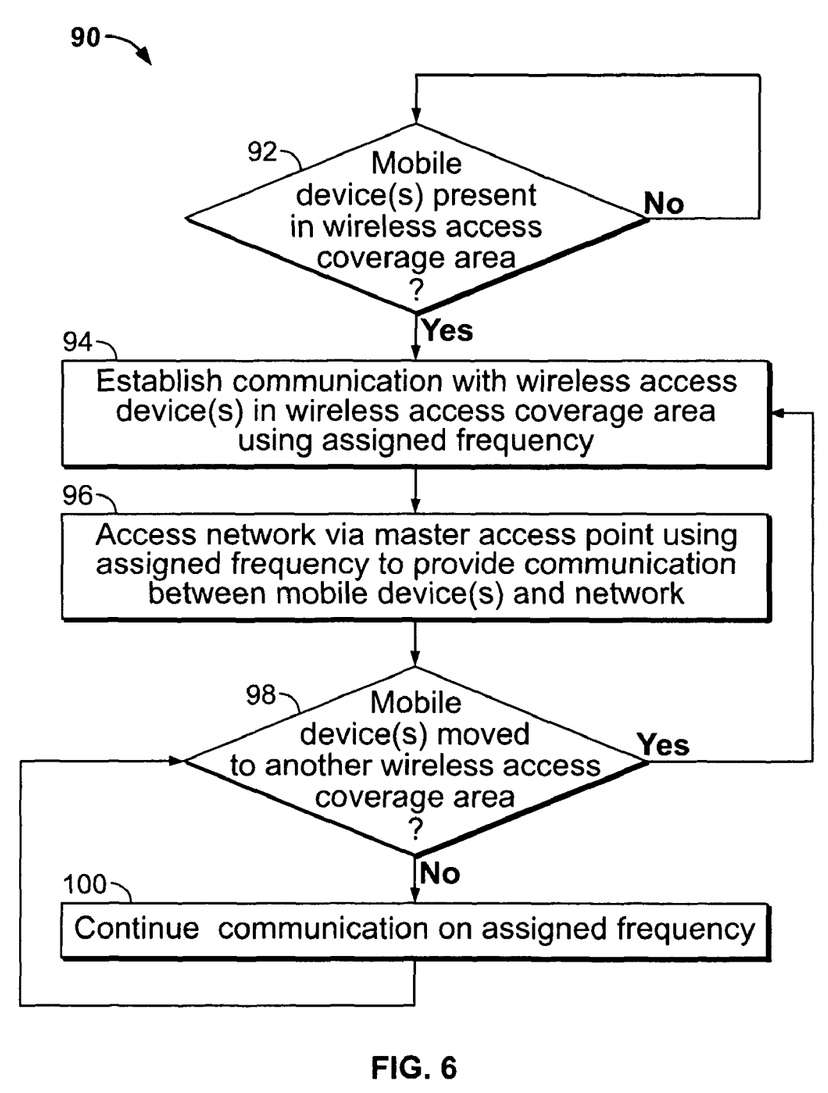
FIG. 6 is a flowchart of a method for communicating within a communication cell in accordance with various embodiments of the invention.

In an exemplary embodiment, communication is provided within the wireless communication cell 70 and the backhaul macro-communication cell 80 as shown in flowchart 90 in FIG. 6. Specifically, at 92, a determination is made as to whether any mobile devices 58 (shown in FIG. 2) are present in a wireless access coverage area 54 (shown in FIG. 2). For example, a determination may be made, as is known, as to whether a laptop computer is attempting to access the network in a recognized hot-spot. If a mobile device 58 is present, then at 94, wireless communication is established with the mobile device 58 via the local access point 52 in that wireless access coverage area 54 using the assigned frequency, for example, using a first radio 56 as described herein. It should be noted that access may be provided to only authorized mobile devices 58 (e.g., a secure connection) or may be provided to any mobile devices 58 (e.g., non-secure connection). Thereafter, at 96, access to the network, for example, to download information from the Internet or access an email account, is provided via the master access point 62 (shown in FIG. 2) using the assigned frequency, such as, using a second radio 56 as described herein. Thus, communication is provided from the mobile device 58 to the network, via the local access point 52 and master access point 62 using different frequencies as described herein. It should be noted that the assigned frequencies may be selected as desired or needed, for example, based on the communication application.

At 98 a determination is made as to whether the mobile device 58 has moved to another wireless access coverage area 54, for example, by determining whether the mobile device 58 is still accessing the local access point 52. If not, then communication is maintained on the assigned frequency at 100. If the mobile device 58 has moved to an area covered by another local access point 52, then communication is established at 94 within a different wireless access coverage area 54 corresponding to the new local access point 52. It should be noted that the mobile device 58 may move between different communication cells 70 with the same process described above implemented in each communication cell 70.

Thus, the available bandwidth is dedicated as separate mobile frequencies and backhaul frequencies, wherein the mobile frequencies are tessellated to allow network scalability as shown in FIG. 3. Using this tessellated frequency arrangement, a macro-frequency plan for backhaul communication may be provided. It should be noted that although a frequency reuse pattern of seven is shown (i.e., seven local access points 52 in each communication cell 70), other reuse patterns such as 3, 4, 14, etc. can be used. Further, although each of the master access points 62, which may define a backhaul access point, are described having a wired backhaul connection, variations may be provided, such as, for example, having alternating wired and wireless connections. Additionally, different sub-cells other than "4" in each of or all of the communication cells 70 may be configured as the backhaul access point. Also, although the sub-cells or wireless access coverage areas 54 are shown as hexagons, different configurations may be provided, for example rectangles or squares. Also, the communication channels may be modified such that the transition is different than 1 MHz channels for local access point 52 to mobile device 58 communication and 5 Mhz channels for local access point 52 to master access point 62 communication.

The wireless network architecture provided by the various embodiments of the present invention allows for (i) a reduced number of fixed wired connections to access points through the use of a wireless backhaul; (ii) dedicated bandwidth for (a) access point to mobile communication and (b) access point to backhaul communication; (iii) tessellated micro-frequency planning to allocate frequencies to each access point in a local area to reduce or avoid interfering with adjacent or neighboring access points; (iv) tessellated macro-frequency planning to allocate frequencies among a master-slave network of access points to reduce or avoid interference in the wireless backhaul; and (v) use of the same frequency band for both mobile device to local access point communication and local access point to backhaul communication through an allocation of the sub-channels in the band among these functions.

Thus, simultaneous communication may be provided between (i) mobile devices and local access points and (ii) local access points and the network via master access points without interference using different frequencies as described herein.

While the invention has been described in terms of various specific embodiments, those skilled in the art will recognize that the invention can be practiced with modification within the spirit and scope of the claims.

What is claimed is:

1. A wireless network using a common wireless communications protocol comprising:
    a plurality of communications cells configured to use the common wireless communications protocol, each communications cell comprising
    a plurality of local access points arranged to define a given communications cell, each local access point being configured to communicate with a mobile device within a respective wireless coverage area using the common wireless communications protocol and at a respective frequency from among a set of local access point frequencies, and
    a master access point positioned within the give a communications cell and configured to
    communicate with a mobile device within a respective wireless coverage area of the given communications cell using the common wireless communications protocol and at a respective frequency from among the set of local access point frequencies,
    communicate with each local access point within the given communications cell also using the common wireless communications protocol and at a frequency different from the set of frequencies of the set of local access point frequencies, and provide a wired backhaul communications link wherein each of the local access points comprises a first radio and a second radio, the first radio configured to communicate with the mobile device and the second radio configured to communicate with the master access point, and each of the first radios is configured at a different frequency within the set of local access point frequencies and each of the second radios is configured at the frequency different from the set of local access point frequencies.

2. The wireless network in accordance with claim 1 wherein the wireless coverage areas are in a tessellated configuration.

3. The wireless network in accordance with claim 2 wherein the tessellated configuration comprises one of a plurality of (i) hexagon and (ii) square wireless coverage areas.

4. The wireless network in accordance with claim 1 wherein each of the first radios is configured at a single frequency within the set of local access point frequencies and each of the second radios is configured at the frequency different from the set of local access point frequencies.

5. The wireless network in accordance with claim 1 wherein the common communications protocol comprises the IEEE 802.11 protocol.

6. The wireless network in accordance with claim 1 wherein the common communications comprises the IEEE 802.16 protocol.

7. A communications cell for a wireless network using a common wireless communications protocol comprising:
    a plurality of local access points, each local access point being configured to communicate with a mobile device within a respective wireless coverage area using the common wireless communications protocol and at a respective frequency from among a set of local access point frequencies; and
    a master access point configured to
    communicate with a mobile device within a respective wireless coverage area using the common wireless communications protocol and at a respective frequency from among the set of local access point frequencies,
    communicate with each local access point also using the common wireless communications protocol and at a frequency different from the set of frequencies of the set of local access point frequencies, and
    provide a wired backhaul communications link wherein each of the local access points comprises a first radio and a second radio, the first radio configured to communicate with the mobile device and the second radio configured to communicate with the master access point, and each of the first radios is configured at a different frequency within the set of local access point frequencies and each of the second radios is configured at the frequency different from the set of local access point frequencies.

8. The communications cell in accordance with claim 7 wherein the wireless coverage areas are in a tessellated configuration.

9. The communications cell in accordance with claim 8 wherein the tessellated configuration comprises one of a plurality of (i) hexagon and (ii) square wireless coverage areas.

10. The communications cell in accordance with claim 7 wherein each of the first radios is configured at a single frequency within the set of local access point frequencies and each of the second radios is configured at the frequency different from the set of local access point frequencies.

11. The communications cell in accordance with claim 7 wherein the common communications protocol comprises the IEEE 802.11 protocol.

12. The communications cell in accordance with claim 7 wherein the common communications protocol comprises the IEEE 802.16 protocol.

13. A method of making a wireless network comprising a plurality of communications cells configured to use a common wireless communications protocol, the method comprising:
    arranging a plurality of local access points to define a given communications cell, and configuring each local access point to communicate with a mobile device within a respective wireless coverage area using the common wireless communications protocol and at a respective frequency from among a set of local access point frequencies;
    positioning a master access point within the given communications cell; and configuring the master access point to
    communicate with a mobile device within a respective wireless coverage area of the given communications cell using the common wireless communications protocol and at a respective frequency from among the set of local access point frequencies,
    communicate with each local access point within the given communications cell also using the common wireless communications protocol and at a frequency different from the set of frequencies of the set of local access point frequencies, and provide a wired backhaul communications link, wherein each of the local access points comprises a first radio and a second radio, the first radio configured to communicate with the mobile device and the second radio configured to communicate with the master access point, and each of the first radios is configured at a different frequency within the set of local access point frequencies and each of the second radios is configured at the frequency different from the set of local access point frequencies.

14. The method in accordance with claim 13 wherein the wireless coverage areas are in a tessellated configuration.

15. The method in accordance with claim 14 wherein the tessellated configuration comprises one of a plurality of (i) hexagon and (ii) square wireless coverage areas.

16. The method in accordance with claim 13 wherein each of the first radios is configured at a single frequency within the set of local access point frequencies and each of the second radios is configured at the frequency different from the set of local access point frequencies.

17. The method in accordance with claim 13 wherein the common communications protocol comprises the IEEE 802.11 protocol.

18. The method in accordance with claim 13 wherein the common communications protocol comprises the IEEE 802.16 protocol.

* * * * *

(12) EX PARTE REEXAMINATION CERTIFICATE (9891st)
United States Patent
Henderson et al.

(10) Number: US 7,916,684 C1
(45) Certificate Issued: Oct. 21, 2013

(54) WIRELESS COMMUNICATION NETWORK PROVIDING COMMUNICATION BETWEEN MOBILE DEVICES AND ACCESS POINTS

(75) Inventors: Gregory Newell Henderson, Sudbury, MA (US); Dennis Michael Martinez, Westford, MA (US)

(73) Assignee: Harris Corporation, Melbourne, FL (US)

Reexamination Request:
No. 90/012,688, Sep. 15, 2012

Reexamination Certificate for:
Patent No.: 7,916,684
Issued: Mar. 29, 2011
Appl. No.: 10/985,589
Filed: Nov. 11, 2004

(51) Int. Cl.
*H04W 4/00* (2009.01)

(52) U.S. Cl.
USPC .......................................... 370/328; 370/338

(58) Field of Classification Search
None
See application file for complete search history.

(56) References Cited

To view the complete listing of prior art documents cited during the proceeding for Reexamination Control Number 90/012,688, please refer to the USPTO's public Patent Application Information Retrieval (PAIR) system under the Display References tab.

*Primary Examiner* — Salman Ahmed (57) ABSTRACT

A wireless communication network is provided that includes a plurality of access points. A plurality of the access points are configured as local access points that are each configured to operate at one of a set of frequencies and within a communication range. The local access points may communicate with a mobile device within the corresponding local access point communication range. The wireless network further includes an access point configured as a master access point to communicate with each of the plurality of local access points at a frequency that is outside the set of frequencies of the local access points.

US 7,916,684 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7 and 13 are determined to be patentable as amended.

Claims 5, 11 and 17, dependent on an amended claim, are determined to be patentable.

New claims 19-20 are added and determined to be patentable.

Claims 2-4, 6, 8-10, 12, 14-16 and 18 were not reexamined.

1. A wireless network using a common wireless communications protocol comprising:
    a plurality of communications cells configured to use the common wireless communications protocol, each communications cell comprising
    a plurality of local access points arranged to define a given communications cell, each local access point being configured to communicate with a mobile device within a respective wireless coverage area using the common wireless communications protocol and at a respective frequency from among a set of local access point frequencies, and
    a master access point positioned within [the give a] *the given* communications cell and configured to
    communicate with a mobile device within a respective wireless coverage area of the given communications cell using the common wireless communications protocol and at a respective frequency from among the set of local access point frequencies,
    communicate with each local access point within the given communications cell also using the common wireless communications protocol and at a frequency different from the set of frequencies of the set of local access point frequencies, and provide a wired backhaul communications link wherein each of the local access points comprises a first radio and a second radio, the first radio configured to communicate with the mobile device and the second radio configured to communicate *simultaneously* with the master access point, and each of the first radios is configured at a different frequency within the set of local access point frequencies and each of the second radios is configured at the frequency different from the set of local access point frequencies, *wherein simultaneous wireless communication occurs between (i) mobile devices and local access points, and (ii) local access points and the master access point using the different frequencies.*

7. A communications cell for a wireless network using a common wireless communications protocol comprising:
    a plurality of local access points, each local access point being configured to communicate with a mobile device within a respective wireless coverage area using the common wireless communications protocol and at a respective frequency from among a set of local access point frequencies; and
    a master access point configured to
    communicate with a mobile device within a respective wireless coverage area using the common wireless communications protocol and at a respective frequency from among the set of local access point frequencies,
    communicate with each local access point also using the common wireless communications protocol and at a frequency different from the set of frequencies of the set of local access point frequencies, and
    provide a wired backhaul communications link wherein each of the local access points comprises a first radio and a second radio, the first radio configured to communicate with the mobile device and the second radio configured to communicate *simultaneously* with the master access point, and each of the first radios is configured at a different frequency within the set of local access point frequencies and each of the second radios is configured at the frequency different from the set of local access point frequencies, *wherein simultaneous wireless communication occurs between (i) mobile devices and local access points, and (ii) local access points and the master access point using the different frequencies.*

13. A method of making a wireless network comprising a plurality of communications cells configured to use a common wireless communications protocol, the method comprising:
    arranging a plurality of local access points to define a given communications cell, and configuring each local access point to communicate with a mobile device within a respective wireless coverage area using the common wireless communications protocol and at a respective frequency from among a set of local access point frequencies;
    positioning a master access point within the given communications cell; and configuring the master access point to
    communicate with a mobile device within a respective wireless coverage area of the given communications cell using the common wireless communications protocol and at a respective frequency from among the set of local access point frequencies,
    communicate with each local access point within the given communications cell also using the common wireless communications protocol and at a frequency different from the set of frequencies of the set of local access point frequencies, and
    provide a wired backhaul communications link, wherein each of the local access points comprises a first radio and a second radio, the first radio configured to communicate with the mobile device and the second radio configured to communicate *simultaneously* with the master access point, and each of the first radios is configured at a different frequency within the set of local access point frequencies and each of the second radios is configured at the frequency different from the set of local access point frequencies, *wherein simultaneous wireless communication occurs between (i) mobile devices and local access points, and (ii) local access points and the master access point using the different frequencies.*

*19. A wireless network using a common wireless communications protocol comprising:*
    *a plurality of communications cells configured to use the common wireless communications protocol, each communications cell comprising:* a plurality of local access points arranged to define a given communications cell, each local access point being configured to communicate with a mobile device within a respective wireless coverage area using the common wireless communications protocol and at a respective frequency from among a set of local access point frequencies, and a master access point positioned within the given communications cell and configured to:

communicate with a mobile device within a respective wireless coverage area of the given communications cell using the common wireless communications protocol and at a respective frequency from among the set of local access point frequencies, and communicate omnidirectionally with each local access point within the given communications cell also using the common wireless communications protocol and at a frequency different from the set of frequencies of the set of local access point frequencies, and provide a wired backhaul communications link, wherein each of the local access points comprises a first radio and a second radio, the first radio configured to communicate with the mobile device and the second radio configured to communicate simultaneously with the master access point, and each of the first radios is configured to operate at a different frequency within the set of local access point frequencies and each of the second radios is configured to operate at the frequency different from the set of local access point frequencies, wherein simultaneous wireless communication occurs between (i) mobile devices and local access points, and (ii) local access points and the master access point using the different frequencies.

20. The wireless network in accordance with claim 19 wherein the common communications protocol comprises the IEEE 802.11 protocol.

\* \* \* \* \*

US007916684C2

(12) EX PARTE REEXAMINATION CERTIFICATE (10275th)
United States Patent
Henderson et al.

(10) Number: US 7,916,684 C2
(45) Certificate Issued: Aug. 27, 2014

(54) WIRELESS COMMUNICATION NETWORK PROVIDING COMMUNICATION BETWEEN MOBILE DEVICES AND ACCESS POINTS (75) Inventors: Gregory Newell Henderson, Sudbury, MA (US); Dennis Michael Martinez, Westford, MA (US)

(73) Assignee: Harris Corporation, Melbourne, FL (US)

Reexamination Request:
No. 90/013,040, Oct. 23, 2013

Reexamination Certificate for:
Patent No.: 7,916,684
Issued: Mar. 29, 2011
Appl. No.: 10/985,589
Filed: Nov. 11, 2004

Reexamination Certificate C1 7,916,684 issued Oct. 21, 2013

(51) Int. Cl.
*H04W 4/00* (2009.01)
(52) U.S. Cl.
USPC .......................................... 370/328; 370/338

(58) Field of Classification Search
None
See application file for complete search history.

(56) References Cited

To view the complete listing of prior art documents cited during the proceeding for Reexamination Control Number 90/013,040, please refer to the USPTO's public Patent Application Information Retrieval (PAIR) system under the Display References tab.

*Primary Examiner* — Minh Dieu Nguyen (57) ABSTRACT

A wireless communication network is provided that includes a plurality of access points. A plurality of the access points are configured as local access points that are each configured to operate at one of a set of frequencies and within a communication range. The local access points may communicate with a mobile device within the corresponding local access point communication range. The wireless network further includes an access point configured as a master access point to communicate with each of the plurality of local access points at a frequency that is outside the set of frequencies of the local access points.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 13 and 19 are determined to be patentable as amended.

Claims 5, 11, 17 and 20, dependent on an amended claim, are determined to be patentable.

Claims 2-4, 6, 8-10, 12, 14-16 and 18 were not reexamined.

1. A wireless network using a common wireless communications protocol comprising:
    a plurality of communications cells configured to use the common wireless communications protocol, each communications cell comprising
    a plurality of local access points arranged to define a given communications cell, each local access point being configured to communicate with a mobile device within a respective wireless coverage area using the common wireless communications protocol and at a respective frequency from among a set of local access point frequencies, and
    a master access point positioned within the given communications cell and configured to
    *simultaneously* communicate with a mobile device within a respective wireless coverage area of the given communications cell using the common wireless communications protocol and at a respective frequency from among the set of local access point frequencies,
    communicate with each local access point within the given communications cell also using the common wireless communications protocol and at a frequency different from the set of frequencies of the set of local access point frequencies, and provide a wired backhaul communications link wherein each of the local access points comprises a first radio and a second radio, the first radio configured to communicate with the mobile device and the second radio configured to communicate simultaneously with the master access point, and each of the first radios is configured at a different frequency within the set of local access point frequencies and each of the second radios is configured at the frequency different from the set of local access point frequencies, wherein simultaneous wireless communication occurs between (i) mobile devices and local access points, and (ii) local access points and the master access point using the different frequencies.

7. A communications cell for a wireless network using a common wireless communications protocol comprising:
    a plurality of local access points, each local access point being configured to communicate with a mobile device within a respective wireless coverage area using the common wireless communications protocol and at a respective frequency from among a set of local access point frequencies; and
    a master access point configured to
    *simultaneously* communicate with a mobile device within a respective wireless coverage area using the common wireless communications protocol and at a respective frequency from among the set of local access point frequencies,
    communicate with each local access point also using the common wireless communications protocol and at a frequency different from the set of frequencies of the set of local access point frequencies, and
    provide a wired backhaul communications link wherein each of the local access points comprises a first radio and a second radio, the first radio configured to communicate with the mobile device and the second radio configured to communicate simultaneously with the master access point, and each of the first radios is configured at a different frequency within the set of local access point frequencies and each of the second radios is configured at the frequency different from the set of local access point frequencies, wherein simultaneous wireless communication occurs between (i) mobile devices and local access points, and (ii) local access points and the master access point using the different frequencies.

13. A method of making a wireless network comprising a plurality of communications cells configured to use a common wireless communications protocol, the method comprising:
    arranging a plurality of local access points to define a given communications cell, and configuring each local access point to communicate with a mobile device within a respective wireless coverage area using the common wireless communications protocol and at a respective frequency from among a set of local access point frequencies;
    positioning a master access point within the given communications cell; and configuring the master access point to
    *simultaneously* communicate with a mobile device within a respective wireless coverage area of the given communications cell using the common wireless communications protocol and at a respective frequency from among the set of local access point frequencies,
    communicate with each local access point within the given communications cell also using the common wireless communications protocol and at a frequency different from the set of frequencies of the set of local access point frequencies, and
    provide a wired backhaul communications link, wherein each of the local access points comprises a first radio and a second radio, the first radio configured to communicate with the mobile device and the second radio configured to communicate simultaneously with the master access point, and each of the first radios is configured at a different frequency within the set of local access point frequencies and each of the second radios is configured at the frequency different from the set of local access point frequencies, wherein simultaneous wireless communication occurs between (i) mobile devices and local access points, and (ii) local access points and the master access point using the different frequencies.

19. A wireless network using a common wireless communications protocol comprising:
    a plurality of communications cells configured to use the common wireless communications protocol, each communications cell comprising:
    a plurality of local access points arranged to define a given communications cell, each local access point being configured to communicate with a mobile device within a respective wireless coverage area using the common wireless communications protocol and at a respective frequency from among a set of local access point frequencies, and a master access point positioned within the given communications cell and configured to:

*simultaneously* communicate with a mobile device within a respective wireless coverage area of the given communications cell using the common wireless communications protocol and at a respective frequency from among the set of local access point frequencies, and communicate omnidirectionally with each local access point within the given communications cell also using the common wireless communications protocol and at a frequency different from the set of frequencies of the set of local access point frequencies, and provide a wired backhaul communications link, wherein each of the local access points comprises a first radio and a second radio, the first radio configured to communicate with the mobile device and the second radio configured to communicate simultaneously with the master access point, and each of the first radios is configured to operate at a different frequency within the set of local access point frequencies and each of the second radios is configured to operate at the frequency different from the set of local access point frequencies, wherein simultaneous wireless communication occurs between (i) mobile devices and local access points, and (ii) local access points and the master access point using the different frequencies.

* * * * *

(12) EX PARTE REEXAMINATION CERTIFICATE (10793rd)

United States Patent
Henderson et al.

(10) Number: US 7,916,684 C3
(45) Certificate Issued: Jan. 8, 2016

(54) WIRELESS COMMUNICATION NETWORK PROVIDING COMMUNICATION BETWEEN MOBILE DEVICES AND ACCESS POINTS

(75) Inventors: Gregory Newell Henderson, Sudbury, MA (US); Dennis Michael Martinez, Westford, MA (US)

(73) Assignee: HARRIS CORPORATION, Melbourne, FL (US)

Reexamination Request:
No. 90/013,324, Aug. 27, 2014

Reexamination Certificate for:
Patent No.: 7,916,684
Issued: Mar. 29, 2011
Appl. No.: 10/985,589
Filed: Nov. 11, 2004

Reexamination Certificate C1 7,916,684 issued Oct. 21, 2013

Reexamination Certificate C2 7,916,684 issued Aug. 27, 2014

(51) Int. Cl.
H04W 4/00 (2009.01)
H04W 16/12 (2009.01)
H04W 16/02 (2009.01)

(52) U.S. Cl.
CPC ............. *H04W 16/12* (2013.01); *H04W 16/02* (2013.01)

(58) Field of Classification Search
None
See application file for complete search history.

(56) References Cited

To view the complete listing of prior art documents cited during the proceeding for Reexamination Control Number 90/013,324, please refer to the USPTO's public Patent Application Information Retrieval (PAIR) system under the Display References tab.

*Primary Examiner* — Colin LaRose (57) ABSTRACT

A wireless communication network is provided that includes a plurality of access points. A plurality of the access points are configured as local access points that are each configured to operate at one of a set of frequencies and within a communication range. The local access points may communicate with a mobile device within the corresponding local access point communication range. The wireless network further includes an access point configured as a master access point to communicate with each of the plurality of local access points at a frequency that is outside the set of frequencies of the local access points.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 7, 13 and 19 are determined to be patentable as amended.

Claims 5, 11, 17 and 20, dependent on an amended claim, are determined to be patentable.

Claims 2-4, 8-10, 12, 14-16 and 18 were not reexamined.

1. A wireless network using a common wireless communications protocol comprising:
   a plurality of communications cells configured to use the common wireless communications protocol, each communications cell comprising
   a plurality of local access points arranged to define a given communications cell, each local access point being configured to communicate with a mobile device within a respective wireless coverage area using the common wireless communications protocol and at a respective frequency from among a set of local access point frequencies, and
   a master access point positioned within the given communications cell and configured to
   simultaneously communicate with a mobile device within a respective wireless coverage area of the given communications cell using the common wireless communications protocol and at a respective frequency from among the set of local access point frequencies,
   communicate with each local access point within the given communications cell also using the common wireless communications protocol and at a frequency different from the set of frequencies of the set of local access point frequencies, and provide *either* a wired *or wireless* backhaul communications link wherein each of the local access points comprises a first radio and a second radio, the first radio configured to communicate with the mobile device and the second radio configured to communicate simultaneously with the master access point, and each of the first radios is configured at a different frequency within the set of local access point frequencies and each of the second radios is configured at the frequency different from the set of local access point frequencies, wherein simultaneous wireless communication occurs between (i) mobile devices and local access points, and (ii) local access points and the master access point using the different frequencies, *wherein said master access points of the plurality of communications cells have alternating wired and wireless backhaul communications links.*

6. The wireless network in accordance with claim 1 wherein the common communications *protocol* comprises the IEEE 802.16 protocol.

7. A communications cell for a wireless network using a common wireless communications protocol comprising:
   a plurality of local access points, each local access point being configured to communicate with a mobile device within a respective wireless coverage area using the common wireless communications protocol and at a respective frequency from among a set of local access point frequencies; and
   a master access point configured to
   simultaneously communicate with a mobile device within a respective wireless coverage area using the common wireless communications protocol and at a respective frequency from among the set of local access point frequencies,
   communicate with each local access point also using the common wireless communications protocol and at a frequency different from the set of frequencies of the set of local access point frequencies, and
   provide *either* a wired *or wireless* backhaul communications link wherein each of the local access points comprises a first radio and a second radio, the first radio configured to communicate with the mobile device and the second radio configured to communicate simultaneously with the master access point, and each of the first radios is configured at a different frequency within the set of local access point frequencies and each of the second radios is configured at the frequency different from the set of local access point frequencies, wherein simultaneous wireless communication occurs between (i) mobile devices and local access points, and (ii) local access points and the master access point using the different frequencies, *wherein said communications cell comprises one of a plurality of communications cells in a wireless network using the common wireless communications protocol, and each communications cell having a master access point, wherein said master access points of the plurality of communications cells have alternating wired and wireless backhaul communications links.*

13. A method of making a wireless network comprising a plurality of communications cells configured to use a common wireless communications protocol, the method comprising:
   arranging a plurality of local access points to define a given communications cell, and configuring each local access point to communicate with a mobile device within a respective wireless coverage area using the common wireless communications protocol and at a respective frequency from among a set of local access point frequencies;
   positioning a master access point within the given communications cell; and configuring the master access point to
   simultaneously communicate with a mobile device within a respective wireless coverage area of the given communications cell using the common wireless communications protocol and at a respective frequency from among the set of local access point frequencies,
   communicate with each local access point within the given communications cell also using the common wireless communications protocol and at a frequency different from the set of frequencies of the set of local access point frequencies, and
   provide *either* a wired *or wireless* backhaul communications link, wherein
   each of the local access points comprises a first radio and a second radio, the first radio configured to communicate with the mobile device and the second radio configured to communicate simultaneously with the master access point, and each of the first radios is configured at a different frequency within the set of local access point frequencies and each of the second radios is configured at the frequency different from the set of local access point frequencies, wherein simultaneous wireless communication occurs between (i) mobile devices and local access points, and (ii) local access points and the master access point using the different frequencies, *wherein said master access points of the plurality of communications cells have alternating wired and wireless backhaul communications links.*

19. A wireless network using a common wireless communications protocol comprising:

a plurality of communications cells configured to use the common wireless communications protocol, each communications cell comprising:

a plurality of local access points arranged to define a given communications cell, each local access point being configured to communicate with a mobile device within a respective wireless coverage area using the common wireless communications protocol and at a respective frequency from among a set of local access point frequencies, and a master access point positioned within the given communications cell and configured to:

simultaneously communicate with a mobile device within a respective wireless coverage area of the given communications cell using the common wireless communications protocol and at a respective frequency from among the set of local access point frequencies, and communicate omnidirectionally with each local access point within the given communications cell also using the common wireless communications protocol and at a frequency different from the set of frequencies of the set of local access point frequencies, and provide *either* a wired *or wireless* backhaul communications link, wherein each of the local access points comprises a first radio and a second radio, the first radio configured to communicate with the mobile device and the second radio configured to communicate simultaneously with the master access point, and each of the first radios is configured to operate at a different frequency within the set of local access point frequencies and each of the second radios is configured to operate at the frequency different from the set of local access point frequencies, wherein simultaneous wireless communication occurs between (i) mobile devices and local access points, and (ii) local access points and the master access point using the different frequencies, *wherein said master access points of the plurality of communications cells have alternating wired and wireless backhaul communications links.*

\* \* \* \* \*